(12) United States Patent
Hinz et al.

(10) Patent No.: US 6,866,489 B2
(45) Date of Patent: Mar. 15, 2005

(54) PISTON PUMP

(75) Inventors: Axel Hinz, Neu-Anspach (DE); Hans-Dieter Reinartz, Frankfurt/M. (DE); Peter Volz, Darmstadt (DE); Günther Vogel, Dreieich (DE); Uwe Greiff, Bad Homburg (DE); Matthias Viering, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 18 days.

(21) Appl. No.: 10/239,552

(22) PCT Filed: Mar. 16, 2001

(86) PCT No.: PCT/EP01/03049

§ 371 (c)(1),
(2), (4) Date: Sep. 23, 2002

(87) PCT Pub. No.: WO01/70550

PCT Pub. Date: Sep. 27, 2001

(65) Prior Publication Data

US 2003/0053920 A1 Mar. 20, 2003

(30) Foreign Application Priority Data

Mar. 21, 2000 (DE) .......................... 100 13 858

(51) Int. Cl.$^7$ ........................... F04B 19/00; F16K 25/00
(52) U.S. Cl. ..................... 417/470; 417/569; 137/454.4
(58) Field of Search ................................. 417/470, 471, 417/415, 273, 443; 137/454.4, 539

(56) References Cited

U.S. PATENT DOCUMENTS

| | | | |
|---|---|---|---|
| 5,538,335 A | 7/1996 | Saito et al. .............. 303/116.4 |
| 5,823,639 A | 10/1998 | Zinnkann et al. ............ 417/549 |
| 6,042,350 A | * 3/2000 | Beck ........................... 417/549 |
| 6,283,724 B1 | * 9/2001 | Alaze et al. ................. 417/273 |
| 6,302,663 B1 | * 10/2001 | Schuller et al. ............. 417/554 |
| 6,327,964 B1 | * 12/2001 | Schuller et al. ............... 92/248 |
| 6,394,770 B1 | * 5/2002 | Siegel et al. ................. 417/470 |
| 6,471,496 B1 | * 10/2002 | Merklein et al. ........... 417/569 |
| 6,520,756 B1 | * 2/2003 | Alaze ......................... 417/441 |
| 6,622,751 B1 | * 9/2003 | Beck et al. ............. 137/315.33 |

FOREIGN PATENT DOCUMENTS

| | | |
|---|---|---|
| DE | 195 27 401 | 1/1997 |
| DE | 197 43 186 | 4/1999 |
| DE | 198 16 289 | 8/1999 |
| EP | 0 637 690 | 2/1995 |
| WO | WO 95/16859 | 6/1995 |
| WO | WO 97/05388 | 2/1997 |

OTHER PUBLICATIONS

International Search Report of PCT/EP01/03049 dated Sep. 19, 2001.
German Search Report dated Aug. 16, 2000.

* cited by examiner

*Primary Examiner*—Charles G. Freay
(74) *Attorney, Agent, or Firm*—RatnerPrestia

(57) ABSTRACT

The present invention related to a piston pump, in particular for controllable brake systems such as ABS or ESP, wherein a working chamber of the pump in front of a piston is delimited by a pressure valve, and a resetting spring with its one end is supported on a valve seat carrier of the pressure valve and with its other end resets said piston into its bottom dead center position. An object is to render the assembly of the mass-produced pumps as inexpensive and simple as possible. To achieve this object, the present invention discloses that the resetting spring be adapted to be attached directly or indirectly to the valve seat carrier in addition.

9 Claims, 8 Drawing Sheets

PISTON PUMP

This application is a U.S. national-phase application of PCT International Application No. PCT/EP01/03049.

TECHNICAL FIELD

The present invention relates to a piston pump comprising a working chamber of the pump in front of a piston which is delimited by a pressure valve, and a resetting spring with its one end is supported on a valve seat carrier of the pressure valve and with its other end resets said piston into its bottom dead center position.

BACKGROUND OF THE INVENTION

Pumps of this type are commonly used, especially in controllable brake systems such as ABS or ESP. Because of series production, exacting demands are placed on the low-cost manufacture and assembly of these pumps.

DE 198 16 289 A1 discloses a pressure valve for piston pumps that may be separately operated and tested as a construction unit and permits mounting into a pump housing, in particular, by a caulking or clinching process. Further, it is known in the prior art that a resetting spring for restoring a piston of the pump is supported with its end remote from the piston on a valve seat carrier of the valve. The present invention is based on a piston pump of this type that is relatively complicated and expensive in assembly and manufacture.

In view of the above, an object of the present invention is to reduce costs and simplify the manufacture and assembly of a prior-art piston pump of this type.

Thus, the principle of the present invention involves fixing, in addition to the separately operable pressure valve, at least the resetting spring to the valve of the piston pump by way of the valve seat carrier so that the resetting spring may be assembled along with the pressure valve to achieve a complete subassembly. In this arrangement, the spring may be connected to the valve e.g. by a form lock, or operative or frictional engagement.

An embodiment has proven especially favorable wherein a special spring retainer cup is provided for the resetting spring of the piston and is connected to the valve seat carrier in an appropriate fashion, e.g. by frictional engagement, form lock, or by a detachable locking mechanism, whereby the spring is attached to the valve seat carrier as well.

According to a favorable aspect of the present invention, the spring retainer cup has a generally cylindrical configuration, and the end of the spring retainer cup close to the valve seat carrier is inserted into a recess of the valve seat carrier so that the adjoining surfaces are retained e.g. by frictional or positive engagement. A simple construction is achieved thereby because the spring retainer cup is stiffly placed in the valve seat carrier.

Advantageously, two embodiments are possible. In one embodiment, the end of the resetting spring close to the piston is secured in position by corresponding radial projections of a piston cover which, by means of consoles preferably provided at the spring retainer cup, forms a type of a cage, thereby preventing the spring from dropping out of the cage. Also, the consoles provide in particular a stop for a piston seal provided in the pump housing.

The other possibility resides in securing the spring end remote from the piston in position at the corresponding end of the spring retainer cup by way of form lock or frictional engagement, thereby preventing the spring from dropping out of the cup that is open in this arrangement. It is important for both fixing provisions that the spring is maintained in the cup or guided by said the cup even if the valve unit with the spring retainer cup is positioned and mounted horizontally. This means that the pressure valve with the resetting spring and, possibly, also additionally with the piston, cannot only be mounted in a vertical direction but also in a horizontal direction. The advantage achieved thereby, in turn, is that two oppositely disposed pistons can be mounted simultaneously, while the first type of mounting the pump housing must be swiveled by 180 degrees to be able to introduce one valve with a spring after the other from the top into the corresponding bore of the pump housing.

The spring retainer cup is not only used for the mounting support and alignment of the spring. It may also be provided with small, sieve-like acting perforations at suitable locations so that the spring retainer cup additionally acts as a filter to keep contaminants or wear particles floating in the pressure fluid that are likely to impair or damage the pump or other parts away from moving sealants and valve parts. The filter may e.g. be arranged on the valve seat carrier in front of the opening of the pressure valve adjacent to the working chamber of the pump. As one will mount the retainer cup bottom in front of the side of the valve seat carrier remote from the valve seat, expediently, the filter will be arranged in the center of this side of the spring retainer cup. Another possibility resides in arranging the filter(s) in the peripheral surfaces of the cylinder-shaped spring retainer cup directly in front of the port of channels coming from the pump housing. The filter may be designed integrally with the spring retainer cup, but is may also be provided as a separate component at the spring retainer cup.

In a particularly favorable manner, the needle of a commercial needle bearing is provided as the piston. Needles of this type are mass-produced already today and, therefore, can be procured at low costs.

According to a preferred variation of the present invention, a suction valve is provided in the pump housing and can be mounted and tested independently of the pressure valve, the resetting spring, the spring retainer cup, and the piston. Again, this simplifies the assembly of the piston pump of the present invention.

As has already been mentioned hereinabove, particularly large assembly units are obtained when the resetting spring is additionally connected to the pump piston. The subassembly is then comprised of a pressure valve, resetting spring, spring retainer cup, and piston.

In a favorable aspect of the present invention, the pressure valve may include a valve cover wherein a damping chamber is provided so that, advantageously, the need for a separate damping is obviated.

BRIEF DESCRIPTION OF THE DRAWINGS

In FIG. 1, a pump housing 1 is shown wherein a pump piston 3 is guided, sealed by a piston seal 2. The piston 3 is moved to the left in the drawing plane by an eccentric (not shown) and then returned by a resetting spring 4 into its bottom dead center position, i.e., to the right in the drawing plane. One foot of the piston 3 will follow the non-illustrated external surface of the eccentric. A piston cover 5 is preferably mounted on the piston 3 and can be clamped onto the piston end that is on the left in the drawing so that this cover 5 can adhere to the piston 3 even in the piston's horizontal position. The end of the resetting spring 4 that is on the left in the drawing is locked or jammed in a spring retainer cup 6 so that the spring 4 remains stuck to the spring retainer cup 6 likewise in a horizontal position. The end of the resetting spring 4 that is on the right in the drawing may also be locked or jammed with the piston cover 5. The spring retainer cup 6, in particular with a cylinder-shaped projection 7, is clamped in a corresponding recess 8 in a valve seat member 9, or fastened thereto in any other way, so that it is retained by the valve seat carrier 9, irrespective of position. According to the embodiment, the resetting spring 4 is also fixed thereby to the valve seat carrier 9 in the way of an independently operable construction unit, permitting these components to be jointly mounted during assembly of the piston pump.

Figure 1:
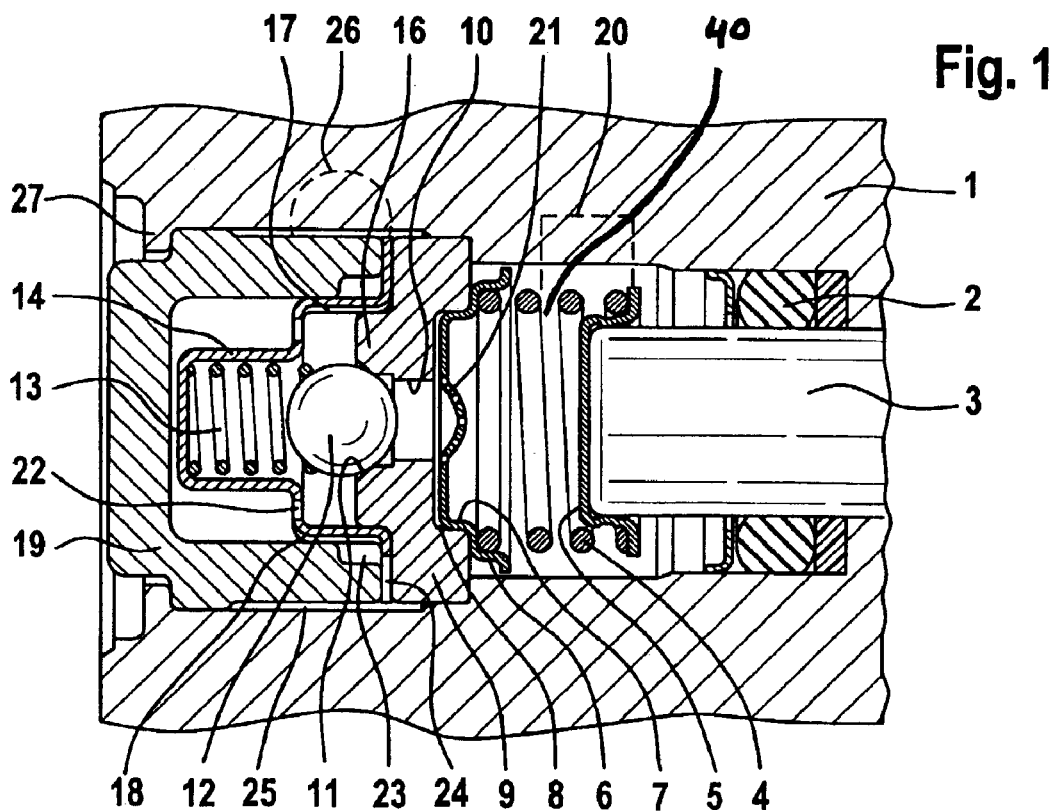
FIGS. 1–2 are longitudinal cross-sectional views of first embodiments of the present invention with a pressure valve in which a spring cage is arranged.

The valve seat carrier 9 has a stepped through-bore 10, the circumferential rounded edge of the bore 10 forming the seat 11 for a preferably spherical valve member 12. Valve member 12 is urged against seat 11 by a preloading spring 13, the other end of the preloading spring 13 being supported on a spring cage 14. The spring cage 14 with a peripheral surface is clamped at a cylinder projection 16 of the valve seat carrier 9, optionally by way of beads, bulged portions, or projections 17. Accordingly, the outside surface of the spring cage 14 may be clamped or press fitted at the inside surface of a valve cover 19, optionally by way of additional beads or projections 18. Thus, the valve including the spring retainer cup 6 and the resetting spring 4 provide a construction unit. Optionally, the piston 3 and the piston cover 5 may be integrated in this unit.

The valve illustrated in FIG. 1 operates as a pressure valve, and the pressure fluid may propagate into the interior of the spring cage 14 by way of a suction channel 20 indicated in broken lines in FIG. 1 and a filter 21 that is preferably worked into the spring retainer cup 6. From there, the pressure fluid, which especially is brake fluid, may propagate through openings 22 into the interior of the valve cover 19 and thereafter between the additional beads 18 into an annular channel 23. Further, the spring cage 14 includes radial recesses 24 that permit discharge of the pressure fluid out of the annular channel 23 into an annular chamber 25, following which is a pressure channel 26, depicted in broken lines, that may lead especially to wheel brakes (not shown) of a controllable brake system. The valve cover 19 that is preferably made of aluminum can be caulked with the pump housing 1 as shown at the stamped portions 27. The caulked engagement is favorably circumferential and can thus seal the annular chamber 25 in a pressure-tight manner.

Figure 2:
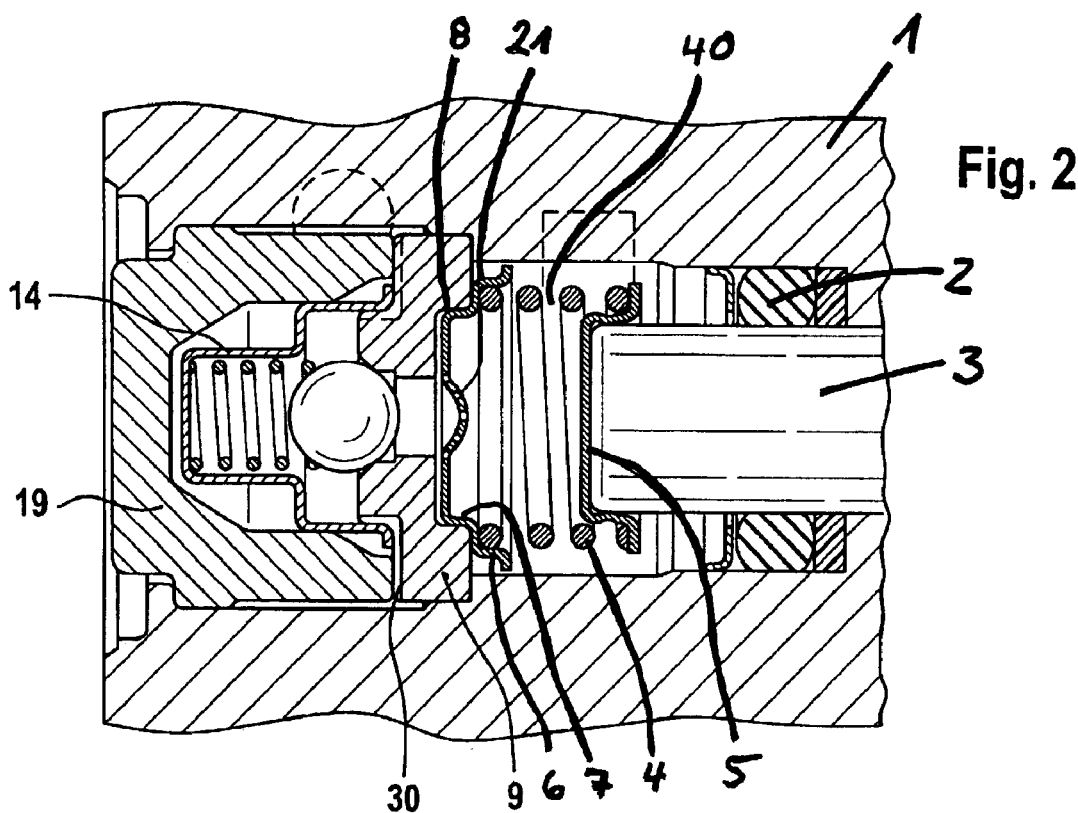

In contrast to FIG. 1, the construction of FIG. 2 is slightly modified as regards to the attachment of the spring cage 14 and the pressure fluid duct. The conduction of the pressure fluid out of the inside of the spring cage 14 in this arrangement is through channels which are provided by grooves 30 indented into the valve seat carrier 9 of the valve cover 19. This renders the flow path for the pressure fluid shorter because it becomes impossible for the pressure fluid to get into the interior area of the valve cover 19 that lies outside the spring cage 14. The attachment of the valve seat carrier 9 and the valve cover 19 is again done by a respective caulking engagement with the pump housing 1, and the cover 19 may be press fitted onto the outside surface of the spring cage 14, and the valve seat carrier 9 may be press fitted onto the inside peripheral surface of the spring cage 14. Grooves 30, in turn, may act as apertures for damping the pressure so that the interior of the cover 19 or the interior of the spring cage 14 (corresponding to FIG. 1 and FIG. 2) may become damping chambers.

Moreover, the spring retainer cup 6 may be drawn from steel exactly as that in FIG. 1, while the valve cover 19 may be extruded from aluminum. Likewise, the spring cage 14 may be drawn from steel sheet. The constructions described are advantageous in that when the cover 19 and the valve seat carrier 9 are connected to create a unit, only low deformation forces will act between the mentioned parts so that there is minimal risk that the dimensions of the valve seat 11 will change due to the joining action. The developing deformation is mainly accommodated in the wall of spring cage 14.

Figure 3:
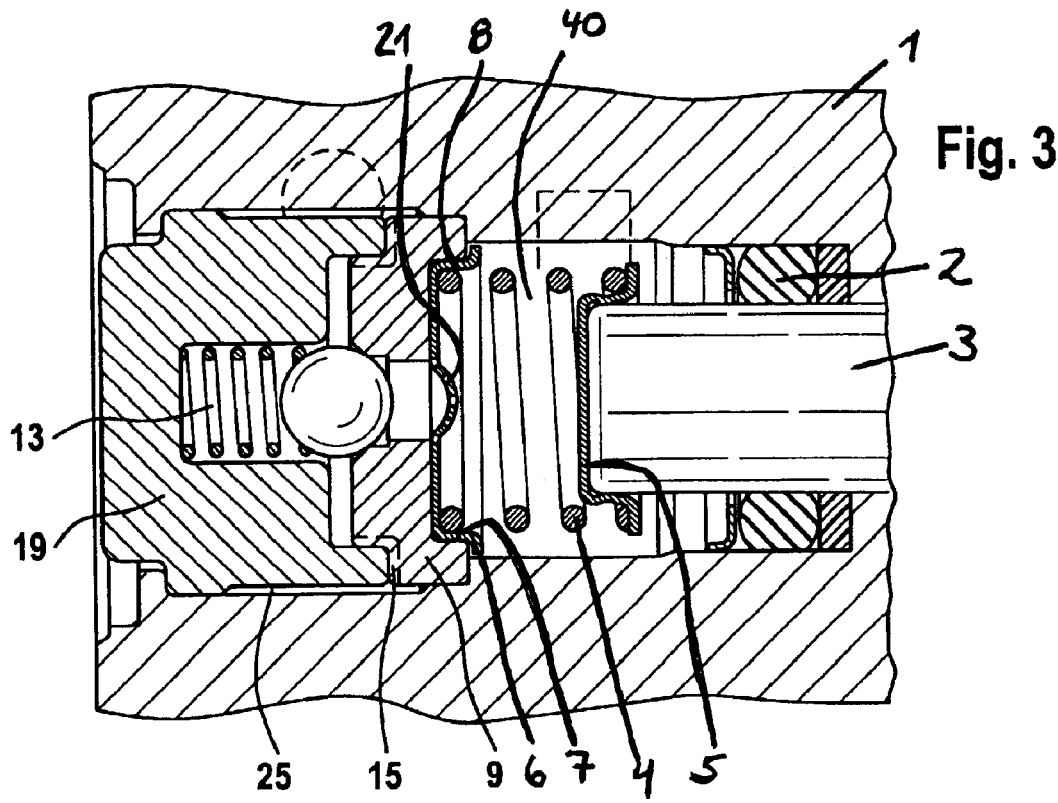
FIGS. 3–4 are also cross-sectional views of further design possibilities of the pressure valve.

In the embodiment of the present invention shown in FIG. 3, there is no special spring cage 14 so that the preloading spring 13 is supported directly on the bottom of the valve cover 19. Cover 19 and valve seat carrier 9 are directly press fitted to each other in this arrangement. In particular, ray-shaped grooves 15 are indented into the valve seat carrier 9 and allow the pressure fluid to exit from the interior of the valve cover 19 into the annular chamber 25. Favorably, this simplifies the construction and achieves a more stable connection of the two parts 9, 19 of the valve.

Figure 4:
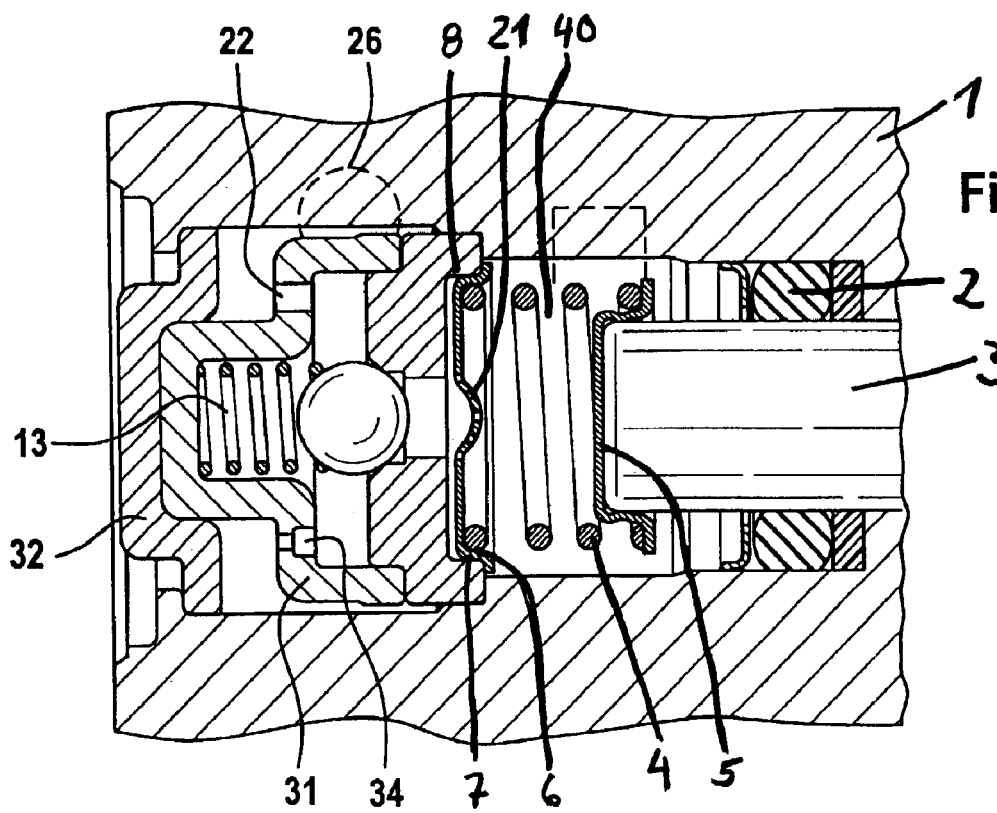

In the embodiment according to FIG. 4, the spring cage 14 which was drawn from steel hereinabove is replaced by a massively drawn aluminum spring cage 31 that ensures the sealing force of the valve and additionally provides for a support for the preloading spring 13. The cover 32 is favorably also made of aluminum, extruded or drawn, and press fitted onto the spring cage 31 so that a very stable construction with material economy is achieved. The pressure fluid is allowed to discharge into the pressure channel 26 through an opening 22 that, alternatively, may also be configured as a stepped nozzle 34, with a damping effect being thereby achieved in addition.

Figure 5:
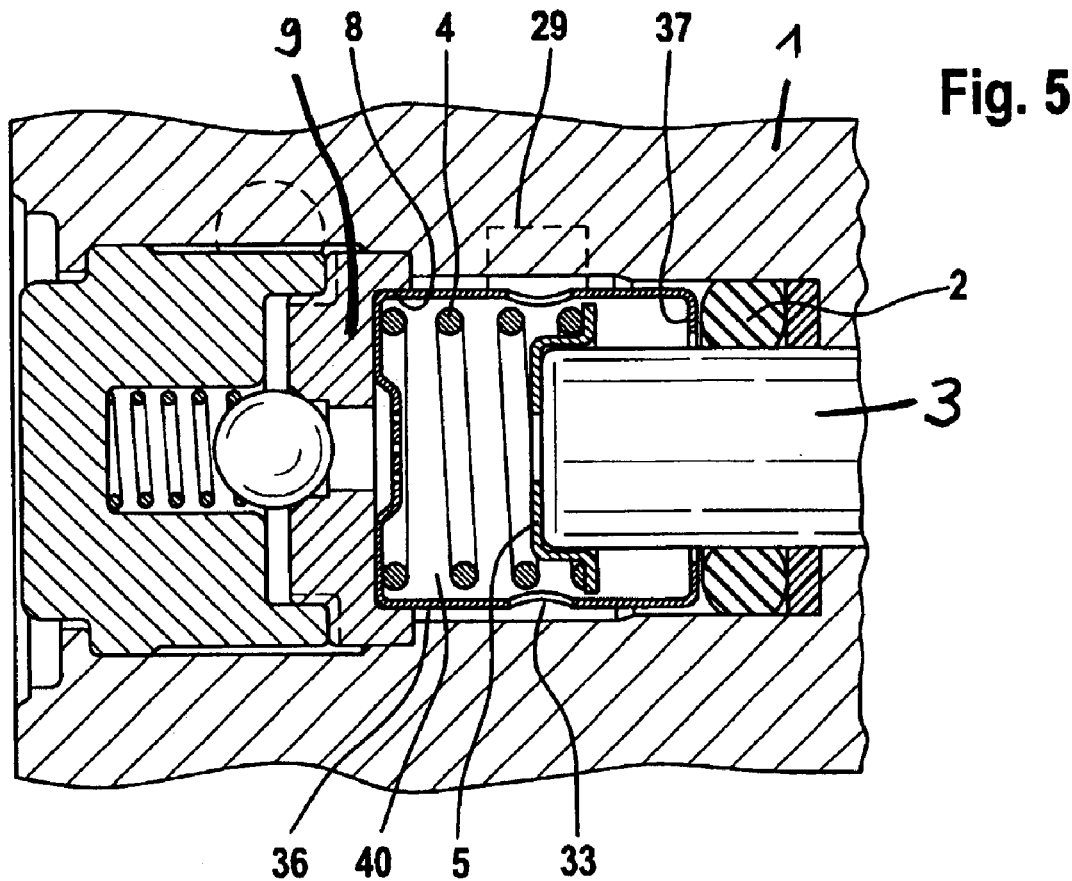
FIGS. 5–6 are cross-sectional views of another embodiment, with a resetting spring for a piston being fastened to the pressure valve according to the present invention.
Figure 6:
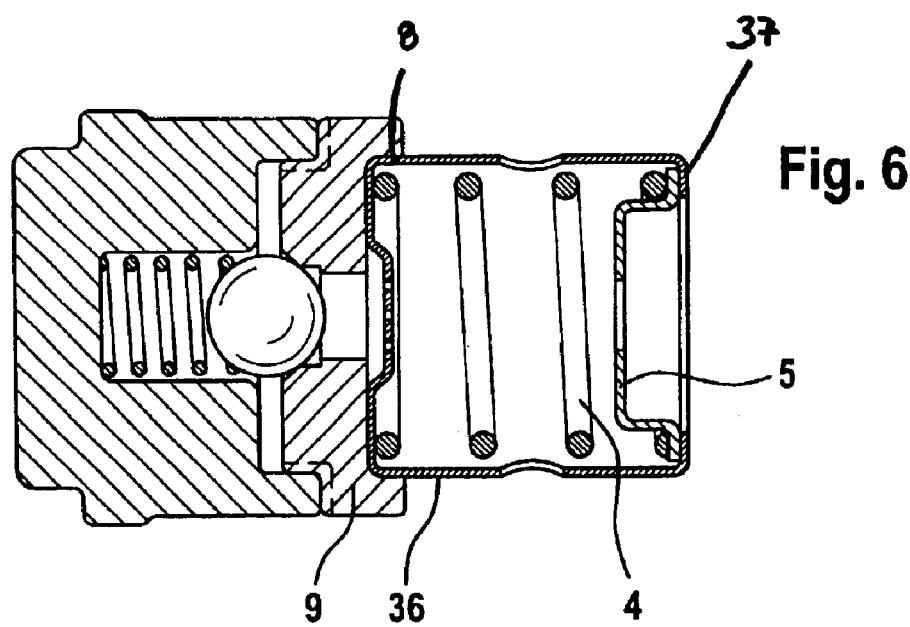

Compared to the designs disclosed in FIGS. 1 to 4, the embodiment of FIGS. 5 and 6 includes modification as far as spring retainer cup 36 is concerned. While in the preceding embodiments the end of the resetting spring 4 close to the valve at least with its uppermost winding was retained in the cup 6 by way of clamping or similar types of attachment, the cup 36 extends up to the sealing assembly 2 in FIGS. 5 and 6. Additionally, the sealing assembly 2 is maintained in its position due to a radially inwards pointing console 37. The console 37 is drawn so far in a radially inward direction that the piston cover 5 cannot leave the interior of the spring retainer cup 36, but will abut on console 37 in the absence of a piston 3 (see FIG. 6). This permits obtaining a preloaded package-like preassembled unit comprised of spring 4, spring retainer cup 36, and piston cover 5. The end of the spring retainer cup 36 which is on the left-hand side in the drawing is again (as has been described already in connection with FIGS. 1 to 4) clamped at the circumferential side wall of the cylinder-shaped recess 8 of the valve seat carrier 9 so that a safe fixing arrangement for the resetting spring 4 is rendered possible even in the event of a horizontal assembly during which the piston 3 may simultaneously be fitted. A radially extending passage opening 33 in the spring retainer cup 36 that is associated with the suction channel 29 allows the entry of pressure fluid into the working chamber 40 of the pump. Thus, an easy-to-mount unit comprised of a pressure valve and a resetting spring 4 is obtained according to the present invention.

Using the stepped valve seat carrier 9 provides a diameter of fit on the side remote from the pump piston 3 that permits the spring retainer cup 36 to be subsequently press fitted or attached in any other manner. This spring retainer cup 36 performs several functions. On the one hand, the pressure fluid is filtered in front of the pressure valve by way of fine punched-out openings or bores in the middle of the cup bottom (not shown). On the other hand, the cylindrical inside portion of cup 36 accommodates the piston resetting spring 4 and the piston cover 5. After beading of the console 37, the preloaded resetting spring 4 is thus fixed in position in the interior of the spring retainer cup 36. In the installed condition, the spring retainer cup 36 further fixes the sealing assembly 2 in the pump housing 1 by means of its console 37.

The embodiment of FIGS. 7 to 10 has a design with respect to the spring retainer cup 6 as described already in connection with FIGS. 1 to 4, while the basic design of the (pressure) valve is already known from FIGS. 3 to 6. The main difference over the preceding designs resides in that the interior of the valve cover 19 is enlarged to accommodate a damping chamber 44 to the greatest degree possible. In order to maintain the necessary stability and strength of material nevertheless, the end of the cover 19 was extended beyond the border 41 of the pump housing 1 herein. Depending on the size of the damping chamber 44 required or desired, the projecting length of the chamber 44 must be extended under certain circumstances up to the contour line 42, as is shown by the dotted contour line 42 in FIG. 7.

Figure 8:
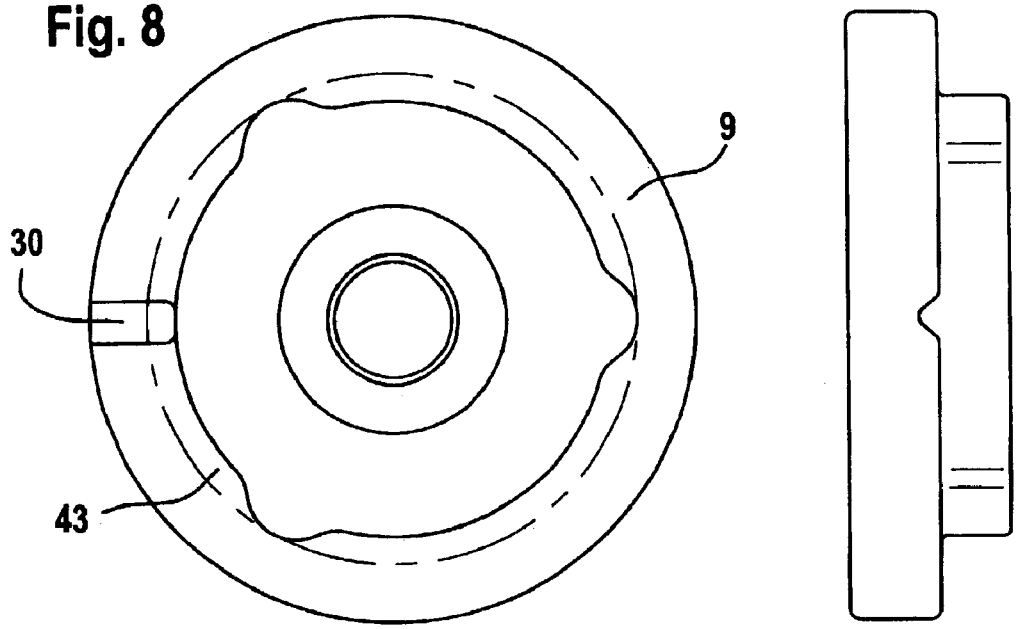
FIGS. 7–10 are longitudinal cross-sectional views of a variation wherein a damping chamber is provided in the pressure valve.
Figure 7:
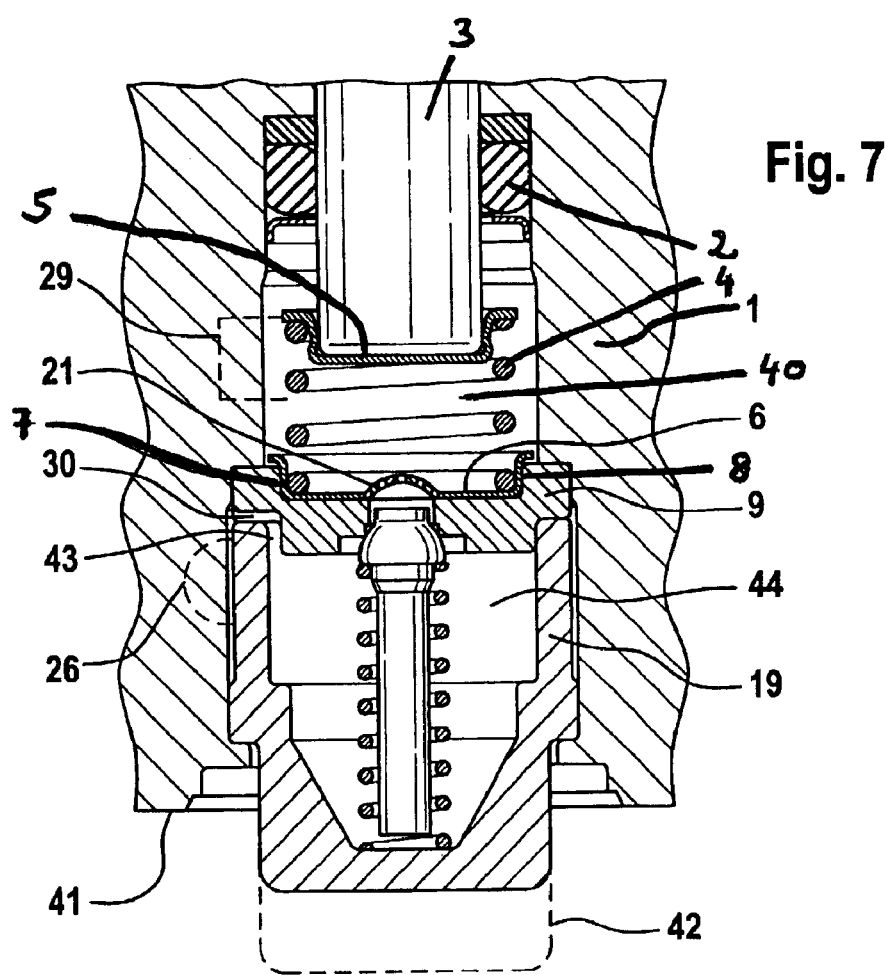

As shown in connection with the top view in FIG. 8, the valve seat carrier 9 may be configured as a cold formed part having a polygonal profile for a particularly simple press-fit connection between the valve cover 19 and the valve seat carrier 9 to thereby produce a radial slot 43 between the valve cover 19 and the valve seat carrier 9 in partial areas of the periphery. Due to its shape, the cover 19 provides the damping volume of the damping chamber 44. The cover 19 may be designed both as a cold formed part or a turned part and, usually, will be made of aluminum like the pump housing 1. As described already with regard to FIGS. 1 to 4, the aperture function is performed by one or more radial notches or grooves 30 (see FIG. 2 with pertinent description). The brake fluid or pressure fluid, respectively, flows through the radial slot 43 to the axial contact point of valve seat carrier 9 and valve cover 19, where an aperture opening is produced by the notch or groove 30. The pressure fluid will then flow through the notch or groove 30 and the pressure channel 26 e.g. in the direction of a tandem master cylinder or a wheel cylinder of a controlled brake system. The suction channel 29 establishes the connection to a non-illustrated suction valve of the pump through which the pressure fluid is aspirated into the pump.

The pressure valve as a preassembled unit with the valve parts 9 and 19, the spring retainer cup 6, and the resetting spring 4, is mounted into the pump housing 1 which, e.g., is used as a valve block. The pressure valve and especially the aperture provided thereon and formed by groove 30 can favorably be protected against particles (e.g. contaminants or chips) within the pressure fluid or brake system by the filter 21 which is disposed in front of the pressure valve in the flow direction, more particularly, in the spring retainer cup 6. Filter 21 is advantageously made of sheet metal and attached to the valve seat carrier 9 especially by means of a press fit. As has already been mentioned above with respect to FIGS. 1 to 4, a channel that acts as a damping aperture can be produced not only by a notch or groove 30 in the valve seat carrier 9, but also by one or more corresponding radial notches on the opposite end surface at the open end of the valve cover 19. Likewise, two opposed small radial notches may e.g. be used to provide a damping aperture. However, it is necessary in this case to ensure the correct position of the notches (not shown).

Figure 9:
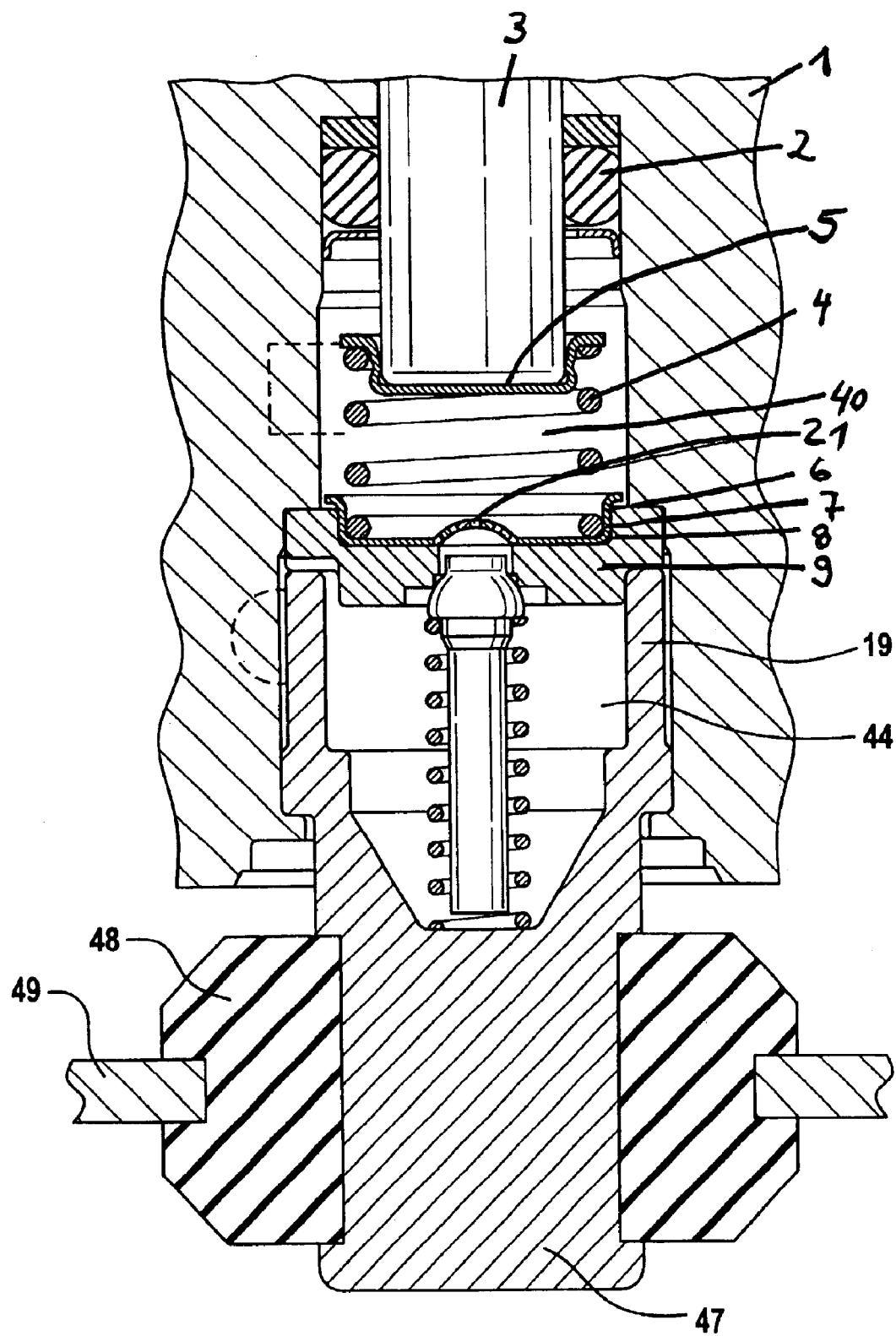

As shown in FIG. 9, the size of the volume required for the damping chamber 44 may lead to the fact (as indicated already with respect to FIG. 7) that the bottom of valve cover 19 projects from the comparatively small pump housing 1. In a favorable aspect of the present invention, this fact may be utilized by taking the extended attachment 47 of the valve cover 19 as an additional retaining point for attaching the pump housing 1 or a hydraulic-electronic control of the brake system to the vehicle. To this end, e.g. a rubber damper 48 may be slipped onto the attachment 47 of the valve cover 19. A sheet-metal retainer 49 may then be inserted into the damper 48, for example. The illustrated geometry of retainer 49 and rubber damper 48 according to FIG. 9 is only meant as an example.

Figure 10:
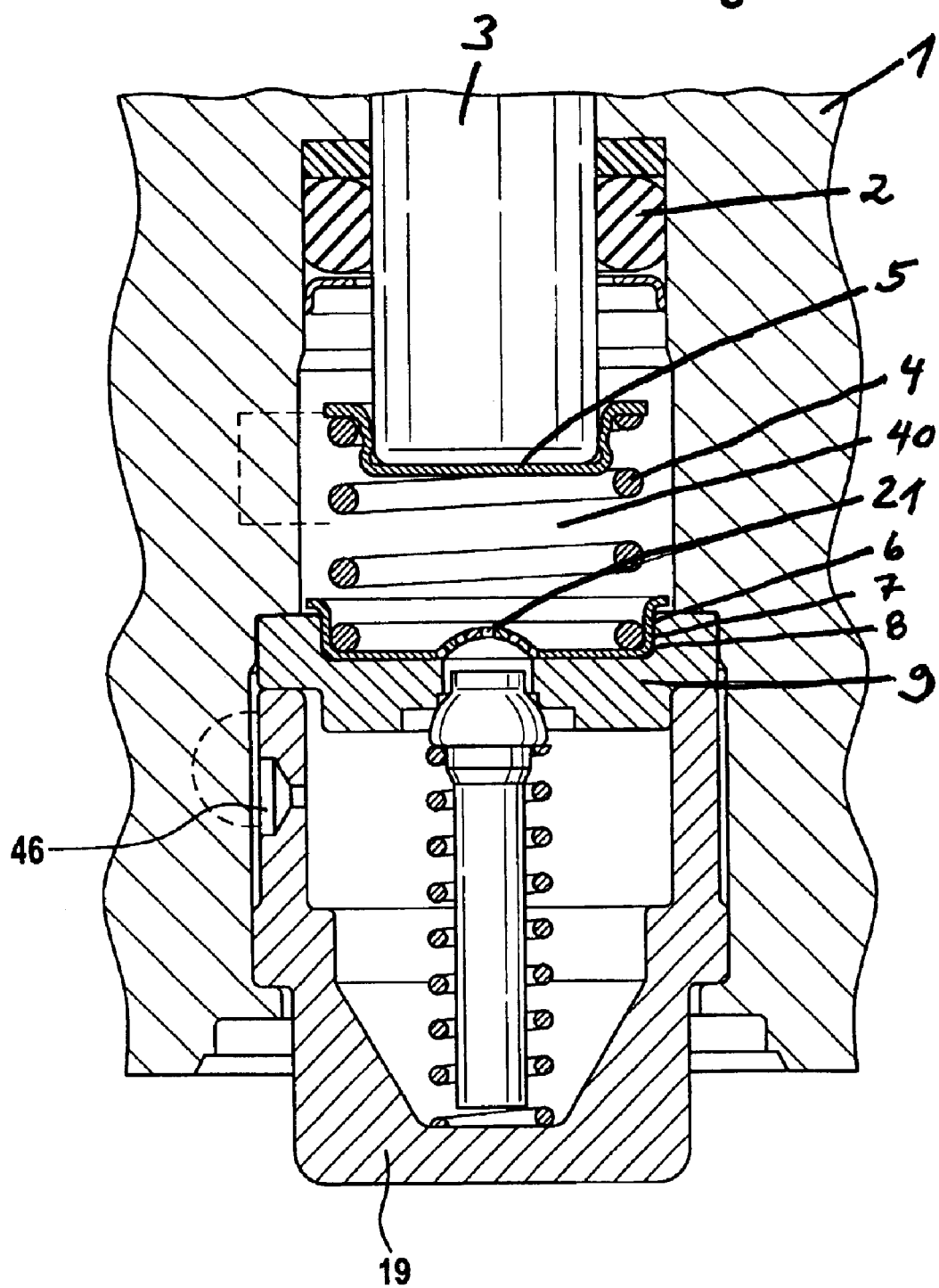

In connection with FIG. 10, the provision of radial notches in the damping aperture was eliminated. Instead, a radial nozzle bore 46 was machined into the annular peripheral surface of the valve cover 19 as an alternative.

Figure 11:
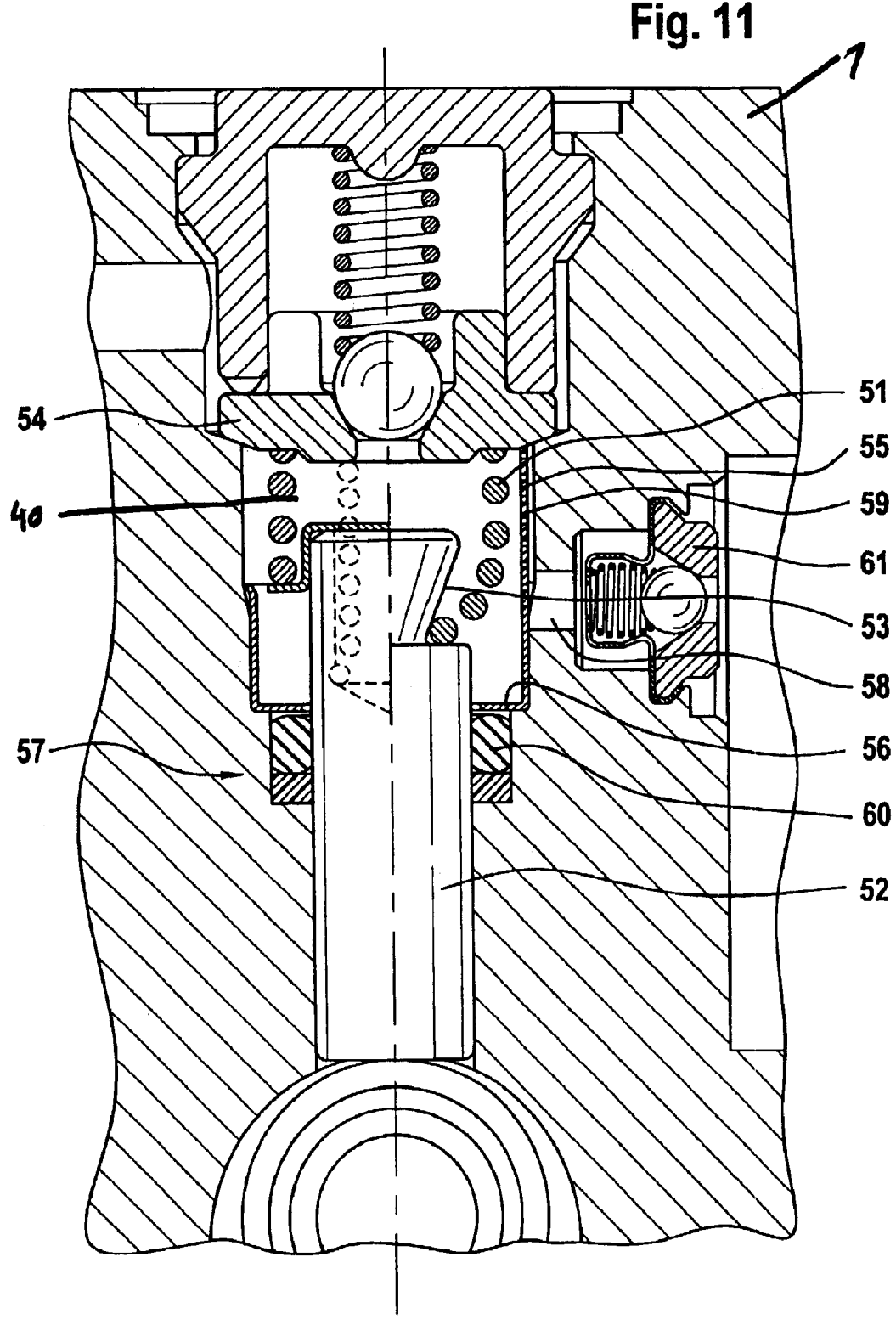
FIG. 11 is a cross-sectional view of a favorable aspect of the present invention wherein the resetting spring is additionally connected to the piston.

The embodiment of FIG. 11 shows a favorable aspect of the present invention aiming at still larger assembly groups that permit being easily and inexpensively mounted for the assembly of a pump being a mass-produced part. The resetting spring 51 includes spring windings towards the piston 52 which reduce in their diameter. A resetting spring 51 is thereby achieved which, at its piston-side end, is e.g. conically tapered. Additionally, the upper end of piston 52 may be provided with a suitable undercut 53 that can be caught by spring 51. The possibility of a cone-shaped undercut 53 shown is meant as an example only. The undercut may also be configured as a groove with a square or partly circular contour or a hemispherical contour. It is essential that a large enough abutment surface extending in a radial direction is provided for the spring 51 due to the undercut 53, the abutment surface being sufficient to have the spring 51 exert the necessary resetting force on the piston 52 so that the latter with its other end remains in engagement with the eccentric (not designated).

As described in the preceding embodiments, the resetting spring 51 is attached by way of a spring retainer cup or directly to the valve seat carrier 54 (not shown), for example by a locking or clamping engagement. In addition to the spring retainer cup or also as a special design of the cup, a spacer 55 can be inserted that keeps with its console 56 the sealing assembly 57 or a piston seal 60 in position. The spacer 55, similar to the above-described spring retainer cup, can take support on the valve seat carrier 54, or the spacer 55 may be designed as a spring retainer cup. The sealing assembly 57 comprises a piston seal 60 and a prop ring (not designated) as in all embodiments of the present invention.

It is preferred that the spacer or spring retainer cup 55, at least In the area of a suction channel 58, is provided with a sieve or filter 59, or is configured as a filter 59, so that it additionally performs a filter function for penetrating pressure fluid. The spacer 55 with the filter function may be designed as a punched part or as a plastic part. However, is it also possible, as has been explained hereinabove In connection with the spring retainer cup 6, to shape undercuts (not illustrated in FIG. 11) Into the valve seat carrier 54, and the end of the resetting spring 51 which is at the top in the drawing can be locked in the undercuts. According to that embodiment, a preassembly group is thereby achieved which may comprise the piston 52 in addition to the valve and the spring 51. It is not necessary in this arrangement that the spring 51 engages from the outside into the undercut 53 of the piston. Rather, piston 52, according to the illustration on the left side of FIG. 11, may also include a bore that extends from the top in the drawing, with the bore including a radially outwardly directed undercut in which the spring 51 introduced into the bore is locked.

Figure 12:
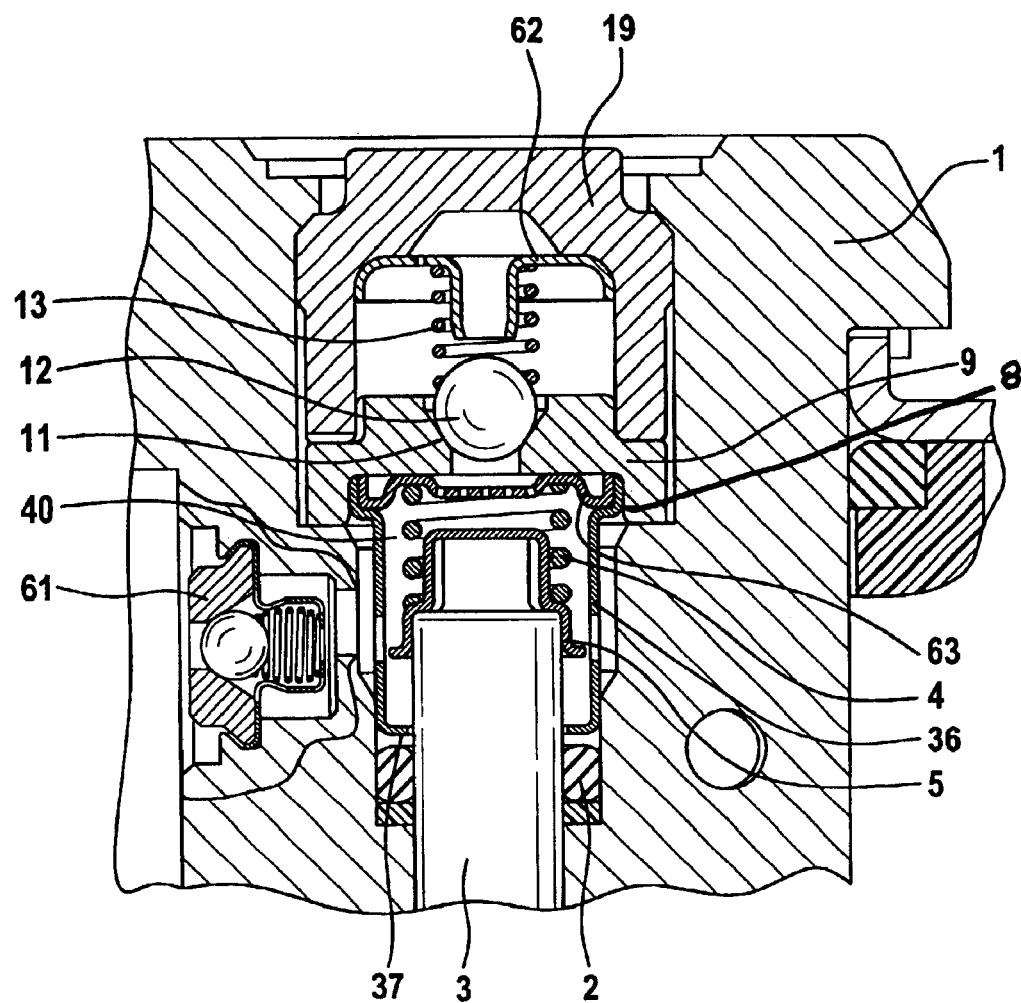
FIG. 12 is a preferred embodiment of the present invention with a filter configured separately of the spring retainer cup, likewise in cross-section.

A suction valve is designated by reference numeral 61 in FIGS. 11 and 12. According to a favorable aspect of an embodiment, this suction valve 61 is configured as a component separate of the pressure valve, resetting spring 4, 51, and piston 3, 51 in all embodiments. The suction valve 61 is attached especially by being wedged into the pump housing 1 and, together with the housing 1, provides a construction unit which is easy to handle and can be tested separately of the pressure valve.

According to the embodiment as shown in FIG. 12, the pump piston 3 is again guided in the pump housing 1 sealed by piston seal 2. In an especially favorable manner, the pump piston 3, as in the preceding embodiments, may be a needle or needle roller of a commercial roller bearing or needle bearing. Especially, piston 3 is configured as a plunger piston 3. A piston 3 of this type has a surface of special quality exhibiting extraordinary wear and sealing properties. Furthermore, needles of a bearing are especially inexpensive as mass-produced parts.

The pressure valve again comprises the valve seat carrier 9 at which the valve seat 11 is provided that cooperates with the valve member 12 designed as a ball in particular. The valve member 12 is preloaded by a spring 13 against the valve seat 11, the other end of the spring 13 being supported on a spring cage 62 that has a guide (not referred to) for spring 13. Similar to the preceding embodiments, spring cage 62 is attached to valve cover 19, for example, by means of a press fit.

The spring retainer cup 36 is incorporated in the working chamber 40 of the piston pump and preferably connected to the valve seat carrier 9. At its end pointing to the piston seal 2, spring retainer 36, similarly to the embodiment shown in FIGS. 5 and 6, includes a console 37 pointing to piston 3 and maintaining the seal 2 in its envisaged position. Further, consoles 37 interact with outwardly extending radial projections that are provided on the piston cover 5 so that the pressure valve, the spring retainer cup 36, the piston cover 5, and the resetting spring 4 can be mounted as an independently operable construction unit into the pump housing 1. According to the present invention, the resetting spring 4 is also attached to the valve seat carrier 9 indirectly by way of the spring retainer cup 36. In addition to this structure, a filter 63 can be provided at the valve seat carrier 9 that is not designed together with the spring retainer cup 36 but as a separate component part in this arrangement.

What is claimed is:

1. Piston pump, in particular for controllable brake systems, comprising a housing, a working chamber of the pump in front of a piston which is delimited by a pressure valve, a resetting spring with its one end supported on a valve seat carrier of the pressure valve and, with its other end, resets the piston into its bottom dead center position, and a spring retainer cup having a cylindrical wall portion,
    wherein the resetting spring at its one end is located in the interior space formed by the cylindrical wall portion of the spring retainer cup.

2. Piston pump as claimed in claim 1, wherein the spring retainer cup with at least one portion of its outside surface is retained at the inside wall of a recess of the valve seat carrier.

3. Piston pump as claimed in claim 1, wherein the spring retainer cup includes a radially inwardly directed console at its end pointing to the piston.

4. Piston pump as claimed in claim 1, wherein a needle of a commercial needle bearing is provided as the piston.

5. Piston pump as claimed in claim 1, wherein arranged in the pump housing is a suction valve that can be assembled and tested independently of the pressure valve, the resetting spring, the spring retainer cup, and the piston.

6. Piston pump as claimed in claim 1, wherein the resetting spring is connected to the piston.

7. Piston pump as claimed in claim 1, wherein the pressure valve includes a valve cover in which a damping chamber is incorporated.

8. Piston pump, in particular for controllable brake systems, comprising a housing, a working chamber of the pump in front of a piston which is delimited by a pressure valve, a resetting spring with its one end supported on a valve seat carrier of the pressure valve and, with its other end, resets the piston into its bottom dead center position, and a spring retainer cup having a cylindrical wall portion,
    wherein the resetting spring at its one end is located in the interior space formed by the cylindrical wall portion of the spring retainer cup,
    the spring retainer cup includes a radially inwardly directed console at its end pointing to the piston, and
    the console provides a stop for a piston seal arranged in the pump housing.

9. Piston pump, in particular for controllable brake systems, comprising a housing, a working chamber of the pump in front of a piston which is delimited by a pressure valve, a resetting spring with its one end supported on a valve seat carrier of the pressure valve and, with its other end, resets the piston into its bottom dead center position, and a spring retainer cup having a cylindrical wall portion,
    wherein the resetting spring at its one end is located in the interior space formed by the cylindrical wall portion of the spring retainer cup, and
    a filter is provided separately or integrally at the spring retainer cup.

* * * * *